June 21, 1932.  R. C. GRIGSBY  1,864,499

WAVE MOTOR DRIVING MECHANISM

Filed Nov. 25, 1927

Russell Cole Grigsby
INVENTOR

Eugene E. Stevens
ATTORNEY

Patented June 21, 1932

1,864,499

UNITED STATES PATENT OFFICE

RUSSELL COLE GRIGSBY, OF STOCKTON, CALIFORNIA

WAVE MOTOR DRIVING MECHANISM

Application filed November 25, 1927. Serial No. 235,631.

My invention relates to improvements in wave operated power plants and has for its primary object to provide a device of this character which,—notwithstanding the intermittent movement of the float under the impulses of the waves,—is capable of generating a power medium of substantially uniform intensity or force.

A more specific object of the invention resides in the provision of a wave operated power plant which incorporates a fluid compressor driven by the float and which combines a fluid driven motor which is operated by the compressed fluid, the motor being available for driving dynamos or machinery.

The invention has for a still further object to provide a device as characterized which will be of relatively simple construction, yet of such strength and durability as to withstand the hard wear to which it is subjected.

The foregoing and other objects of the invention will be readily understood and appreciated by those skilled in the art as the description proceeds, reference being had to the accompanying drawing which illustrates the now preferred form of the invention. It is to be understood, of course, that the invention is capable of other mechanical expressions without departing from the spirit and scope of the invention, as claimed hereinafter.

In the drawing, wherein the same parts have been designated by the same reference characters throughout, Figure 1 is an elevational view, partly in section and illustrating the power plant set up in the sea and ready for use;

Figure 1:
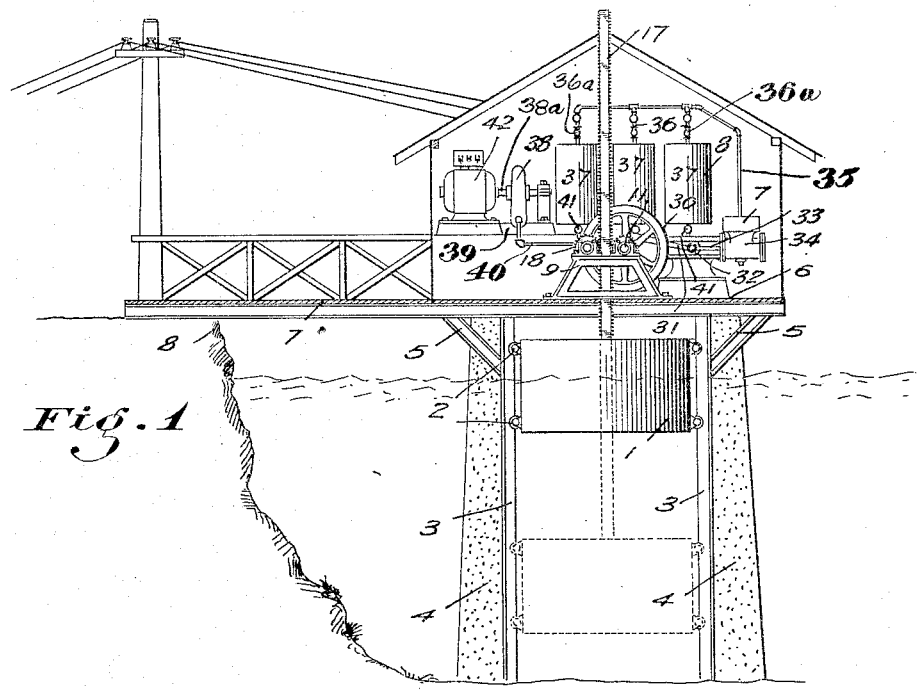
Figure 2:
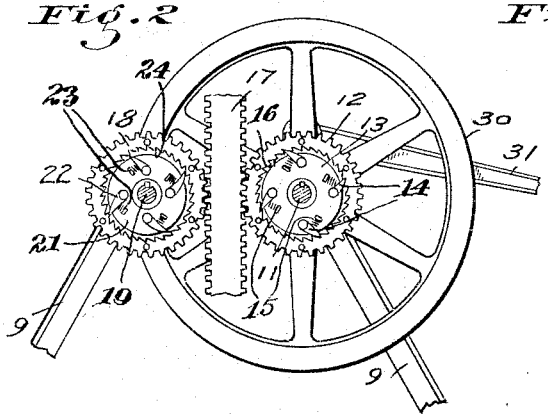
Figure 2 is a vertical cross sectional view on the line 2—2 of Figure 4 and illustrating the drive gearing, fly-wheel and a portion of the connecting rod which attaches to the pump or compressor.
Figure 3:
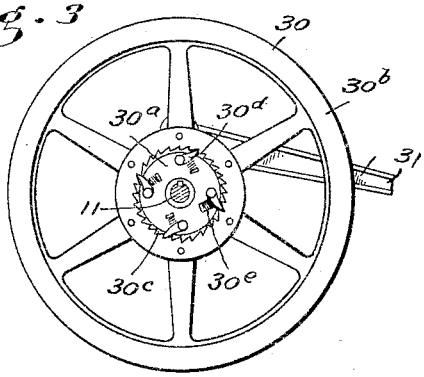
Figure 3 is a sectional view taken on the line 3—3 of Figure 4.

Referring specifically to the drawing, 1 designates a float, diametrically opposite sides of which are provided with grooved rollers 2 for engaging the vertical tracks 3 which are secured to the upstanding columns 4 which are disposed upon the bed of the ocean and secured by suitable piling or the like which is not shown.

The columns 4 may be of any desired form and have diagonal beam portions 5 which cooperate with the upper ends of the columns in supporting a platform 6.

Figure 4:
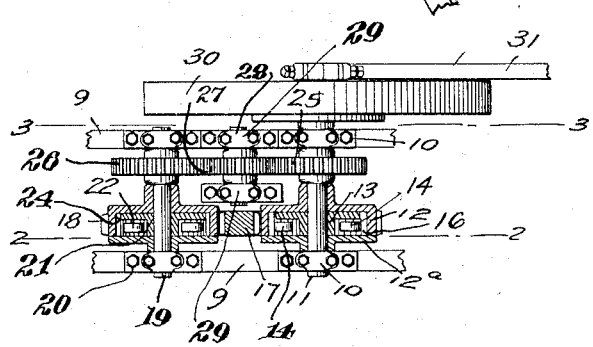
Figure 4 is a top plan view of the gearing showing certain of the latter in cross section.

The platform 6 has a bridge or extension 7 which reaches to the shore 8 and is supported thereon. Mounted upon the platform 6 and above the float 1 are a pair of laterally spaced bearing standards 9 arranged in parallelism and which provide opposed bearings 10 for the shaft 11 upon which is rotatably journalled the circumferentially chambered spur gear 12. Within the spur gear 12 is a disk 13 provided with a circumferential series of pivoted pawls 14 which are urged by springs 15 to engage the circumferential series of ratchet teeth 16, which are provided in the inner periphery of the chambered gear 12. The gear 12 is preferably made in two parts and incorporates a closure element or part 12ª for closing the chamber, as shown in Figure 4.

The float 1 is provided with an upstanding rack bar 17 having teeth on opposite longitudinal edges, one set of teeth meshing with the teeth of the chambered gear 12, while the other set of teeth mesh with a second chambered gear 18 loosely journalled on shaft 19 which is carried in bearings 20 also secured to the bearing standards 9.

The chambered gear 18 is similar in all respects to the chambered gear 12 and has therein a disk 21 keyed to shaft 19 and which disk is provided with pawls 22 urged by springs 23 to engage the ratchet teeth 24, which are formed in the inner peripherial wall of the chambered gear 18. The only difference between the arrangement of gear assemblies 12, 16 and 18, 21 resides in the fact that the ratchet teeth 24 and pawls 22 act in the opposite direction to the ratchet teeth 16 and pawls 14 of gear 12. Thus, when float 1 moves upwardly the hollow gear 12 will be actuated in a clockwise direction to engage its ratchet teeth 16 with the pawls 14 of disk 13 to drive the shaft 11 in a clockwise direction. On the up stroke of the rack bar 12 the hollow gear 18 simply rotates freely and its ratchet teeth 24 slide over the pawls 22 against the actions of the springs 23. On the down stroke of the rack bar 17 under the influence of the float 1 the converse of the described action takes place. In other words, chambered gear 12 runs lose on shaft 11 and shaft 19 is driven by chambered gear 18 through ratchet teeth 24, pawls 22 and disk 21.

The respective shafts 11 and 19 also have keyed thereon spur gears 25, 26, respectively, and each of said spur gears meshes with an intermediate spur pinion 27 upon shaft 28 carried in bearings 29. The object of the spur pinion 27 is to convert the counter-clockwise motion of spur gear 26, on the down stroke of the rack bar 17, into clockwise motion for driving the spur gear 25 and its shaft 11, which by the way is really the power shaft of the driving unit.

On the outer end of the shaft 11 is keyed a fly-wheel 30 to which is connected the piston 31 which attaches as at 32 to the pitman 33 of the air pump or compressor 34. The air compressor 34 has a base which is suitably mounted upon the platform, as shown in Figure 1.

As will be readily appreciated the operation of the float 1 up and down rotates the fly-wheel 30 in a substantially constant fashion driving the piston 33 of compressor 34, the fly-wheel storing up kinetic energy and as far as possible keeping the compressor operating without subjecting the same to jerky impulses which would otherwise be manifest.

The compressed air from the compressor 34 passes through a pipe 35 and from thence through branch pipes 36, which may be controlled by suitable valves 36$^a$, into storage cylinders 37.

The compressed fluid from the reservoirs 37 is thus made available for driving the air turbine 38 which is mounted on a suitable support 39. Connection is had with the fluid supply pipe 40 of the turbine from the reservoir 37 by means of valved outlets 41. The reservoirs or cylinders may have, and preferably will have, suitable gages for indicating the air pressure therein. However, such gages are common and have therefore not been shown, since they form no part of the invention, per se, which is the subject of this application. It will be obvious that when the pressure in one cylinder 37 has reached the certain amount the inlet valve thereof may be shut off and the fluid compressed in the other cylinders. By using the compressed fluid structure described herein it is possible to store up compressed energy in the form of compressed air so that the air turbine can be driven at such times when the sea will be perfectly calm and the float operated slightly if at all. The air turbine 38 shown has its drive shaft 38$^a$ suitably connected to the armature of a generator or dynamo 42 whereby electricity may be generated and used to supply power for lighting and for driving machinery and the like in the vicinity.

The fly-wheel 30 is preferably made in two parts,—namely an inner disk 30$^a$ which is keyed to shaft 11 and an outer wheel portion 30$^b$ of heavy material. The hub part of the weighted wheel portion 30$^b$ is cored out and the inner surface is provided with ratchet teeth 30$^c$ which are adapted to be engaged by dogs 30$^d$ which are urged against the ratchet teeth by means of springs 30$^e$. Thus the fly-wheel weighted portion 30$^b$ is permitted to "race" so as to speak, and run at a faster speed than the disk 30$^a$. For instance, the impulses of the waves will vary and if the weighted portion 30$^b$ of the fly-wheel were rigidly attached to shaft 11 there would be considerable strain upon the gearing which would be called upon, as a result of the momentum of the fly-wheel, to actually lift the float, as for instance when a slight wave impulse followed a very large wave impulse.

Having thus described my invention, what I claim as new and desire to secure by Letters Patent is:

In a drive gearing for a wave operative power plant, comprising an upstanding float, an actuated rack bar having rack teeth on opposite edges thereof, spaced parallel bearing standards, a main power shaft journalled in said bearing standards, a two-part pawl and ratchet gear for driving said main power shaft in a predetermined direction, said two-part pawl and ratchet gear engaging the teeth at one side of said rack, an auxiliary shaft parallel with said main power shaft, a two-part pawl and ratchet gear mounted on said shaft and adapted to drive said second shaft through engagement with the other series of rack teeth of said rack bar when said first mentioned two-part gear is idling, a spur gear secured to each of said shafts, an idler gear disposed between and meshing with each of said spur gears, a bearing supporting said idler gear, one of said bearing standards and said bearing supporting said idler forming a space therebetween for confining the rack bar against lateral shifting to prevent disengagement of its teeth from said two-part pawl and ratchet gears, a fly-wheel on said main power shaft, and a ratchet driving connection between said fly-wheel and main power shaft whereby the wheel will be driven by said shaft when the same is put in motion by the upward movement of said float and the momentum of the wheel will cause it to run free when the shaft slows down, or is stationary, all of said gears being between said standards and said fly-wheel being disposed closely adjacent the outer side of one of said standards.

In testimony whereof I affix my signature.

RUSSELL COLE GRIGSBY.